US009246298B2

(12) United States Patent
Kardokus et al.

(10) Patent No.: US 9,246,298 B2
(45) Date of Patent: Jan. 26, 2016

(54) CORROSION RESISTANT ELECTRODES FOR LASER CHAMBERS

(71) Applicant: Cymer, LLC, San Diego, CA (US)

(72) Inventors: Janine Kardokus, Veradale, WA (US); Thomas P. Duffey, San Diego, CA (US); William N. Partlo, Poway, CA (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 13/840,736

(22) Filed: Mar. 15, 2013

(65) Prior Publication Data

US 2013/0329763 A1    Dec. 12, 2013

Related U.S. Application Data

(60) Provisional application No. 61/657,014, filed on Jun. 7, 2012.

(51) Int. Cl.
*H01S 3/038* (2006.01)
*H01S 3/0971* (2006.01)
*H01S 3/225* (2006.01)

(52) U.S. Cl.
CPC ............ *H01S 3/0388* (2013.01); *H01S 3/0971* (2013.01); *H01S 3/225* (2013.01)

(58) Field of Classification Search
CPC ....... H01S 3/0388; H01S 3/225; H01S 3/097; H01S 3/0971
USPC .......................................................... 372/87
See application file for complete search history.

(56) References Cited

U.S. PATENT DOCUMENTS

| 2,802,733 | A |   | 8/1957 | Bungardt |
|---|---|---|---|---|
| 5,462,575 | A | * | 10/1995 | Del Corso ........................ 75/243 |
| 6,471,792 | B1 |   | 10/2002 | Breedis et al. |
| 6,517,912 | B1 |   | 2/2003 | Morfill et al. |
| 2002/0191661 | A1 |   | 12/2002 | Morton et al. |
| 2004/0037338 | A1 |   | 2/2004 | Morton et al. |
| 2004/0066827 | A1 | * | 4/2004 | Steiger et al. ................... 372/87 |
| 2005/0126666 | A1 |   | 6/2005 | Zhu et al. |
| 2011/0129385 | A1 | * | 6/2011 | Yang-Tung ................... 420/471 |
| 2012/0058005 | A1 |   | 3/2012 | Song |
| 2012/0115317 | A1 |   | 5/2012 | Okumura et al. |

OTHER PUBLICATIONS

International Search Report and the Written Opinion of the International Searching Authority in International Application No. PCT/US2013/042513, Oct. 16, 2013 (9 pages total).

* cited by examiner

*Primary Examiner* — Jessica Stultz
*Assistant Examiner* — Michael Carter
(74) *Attorney, Agent, or Firm* — Martine Penilla Group, LLP

(57) ABSTRACT

Corrosion resistant electrodes are formed of brass that has been doped with phosphorus. The electrodes are formed of brass that contains about 100 ppm to about 1,000 ppm of phosphorus, and the brass has no visible microporosity at a magnification of 400×. The brass may be cartridge brass that contains about 30 weight percent of zinc and the balance copper. Corrosion resistant electrodes also may be formed by subjecting brass to severe plastic deformation to increase the resistance of the brass to plasma corrosion. The corrosion resistant electrodes can be used in laser systems to generate laser light.

16 Claims, 8 Drawing Sheets

CORROSION RESISTANT ELECTRODES FOR LASER CHAMBERS

CLAIM FOR PRIORITY

This application claims priority under 35 U.S.C. §119(e) from U.S. Provisional Application No. 61/657,014, filed Jun. 7, 2012, and entitled "Corrosion Resistant Electrodes for Laser Chambers." The disclosure of this provisional application is incorporated by reference herein for all purposes.

BACKGROUND

Pulsed laser light is used in a number of applications, e.g., in integrated circuit photolithography to expose photoresist on wafers by passing the light through a mask. This pulsed laser light can be generated using a gas discharge medium in a chamber by providing gas discharge between a pair of electrodes at very high voltages in very short electrical discharges in the gas discharge medium.

If the gas discharge medium contains fluorine, e.g., in an ArF laser system, then a fluorine-containing plasma will be generated between the pair of electrodes during operation. Fluorine-containing plasmas are highly corrosive to metals. Consequently, the electrodes will corrode over time during operation of the chamber. If the corrosion product either vaporizes or flakes off of the electrodes, then the situation is tolerable because steps can be taken to deal with the problems caused by this type of corrosion of the electrodes. What sometimes happens, however, is that localized buildups of the metal fluoride corrosion product form at various spots over the surfaces of the electrodes, predominantly on the surface of the anode because fluorine tends to follow the flow of current from the cathode to the anode. This localized buildup of the metal fluoride corrosion product is sometimes referred to as the formation of a "reef layer" or "reefing" due to the similarity in appearance of the corrosion spots to coral reefs. The spots at which reefing occurs on an electrode stick up into the plasma more so than the rest of the surface of the electrode. As such, reefing can cause arcing to occur in the plasma.

Arcing in the plasma is undesirable because it robs the laser chamber of energy because energy goes into the arc discharge rather than into to the laser cavity. Thus, when a significant amount of arcing occurs in the plasma, the electrodes must be replaced to keep the laser chamber operating efficiently. As such, reefing shortens the lifetime during which electrodes can be used effectively in a laser chamber.

It is in this context that embodiments arise.

SUMMARY

In an example embodiment, a laser system is provided. The laser system includes a chamber in which a cathode and an anode are disposed. The cathode has an elongated cathode surface, and the anode has an elongated anode surface that faces the elongated cathode surface. The space between the elongated anode surface and the elongated cathode surface defines a discharge area within the chamber. In one embodiment, the anode is formed of brass that contains about 100 ppm to about 1,000 ppm of phosphorus, and the brass has no visible microporosity at a magnification of 400×. In one embodiment, the anode is movably disposed within the chamber. In another embodiment, the cathode is formed of brass that contains about 100 ppm to about 1,000 ppm of phosphorus, and the brass has no visible microporosity at a magnification of 400×.

In one embodiment, the brass contains about 120 ppm to about 370 ppm of phosphorus. In one embodiment, the brass is cartridge brass that contains 29.7 weight percent to 30.3 weight percent of zinc and the balance copper. In one embodiment, the total amount of impurities in the cartridge brass is less than 100 ppm.

In one embodiment, the anode is formed of a material consisting essentially of 29.7 weight percent to 30.3 weight percent of zinc, 120 ppm to 370 ppm of phosphorus, less than 100 ppm of impurities, and the balance copper, with the material having no visible microporosity at a magnification of 400×. In another embodiment, the cathode is formed of a material consisting essentially of 29.7 weight percent to 30.3 weight percent of zinc, 120 ppm to 370 ppm of phosphorus, less than 100 ppm of impurities, and the balance copper, with the material having no visible microporosity at a magnification of 400×.

In another example embodiment, a method for generating laser light in a laser system is provided. In this method, an electrode is formed from brass that has been subjected to treatment to increase resistance of the brass to plasma corrosion, and the electrode is used in a laser system to generate laser light. In one embodiment, the electrode is an anode. In another embodiment, the electrode is a cathode.

In one embodiment, the treatment to increase the resistance of the brass to plasma corrosion includes doping the brass with about 120 ppm to about 370 ppm of phosphorus.

In one embodiment, the treatment to increase the resistance of the brass to plasma corrosion includes subjecting the brass to severe plastic deformation. In one embodiment, the subjecting of the brass to severe plastic deformation includes subjecting the brass to equal channel angular extrusion.

In yet another example embodiment, an anode assembly for a laser system is provided. The anode assembly includes a lower support member, an upper insulating member, and an anode having an elongated anode surface. The anode is disposed on the lower support member and is surrounded by the upper insulating member so that the elongated anode surface extends above an upper surface of the upper insulating member. The anode is formed of brass that contains about 100 ppm to about 1,000 ppm of phosphorus, and the brass has no visible microporosity at a magnification of 400×.

In one embodiment, the brass contains about 120 ppm to about 370 ppm of phosphorus. In one embodiment, the brass is cartridge brass that contains 29.7 weight percent to 30.3 weight percent of zinc and the balance copper. In one embodiment, the total amount of impurities in the cartridge brass is less than 100 ppm. In one embodiment, the upper insulating member is formed of alumina.

Other aspects and advantages of the inventions will become apparent from the following detailed description, taken in conjunction with the accompanying drawings, which illustrate by way of example the principles of the inventions.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
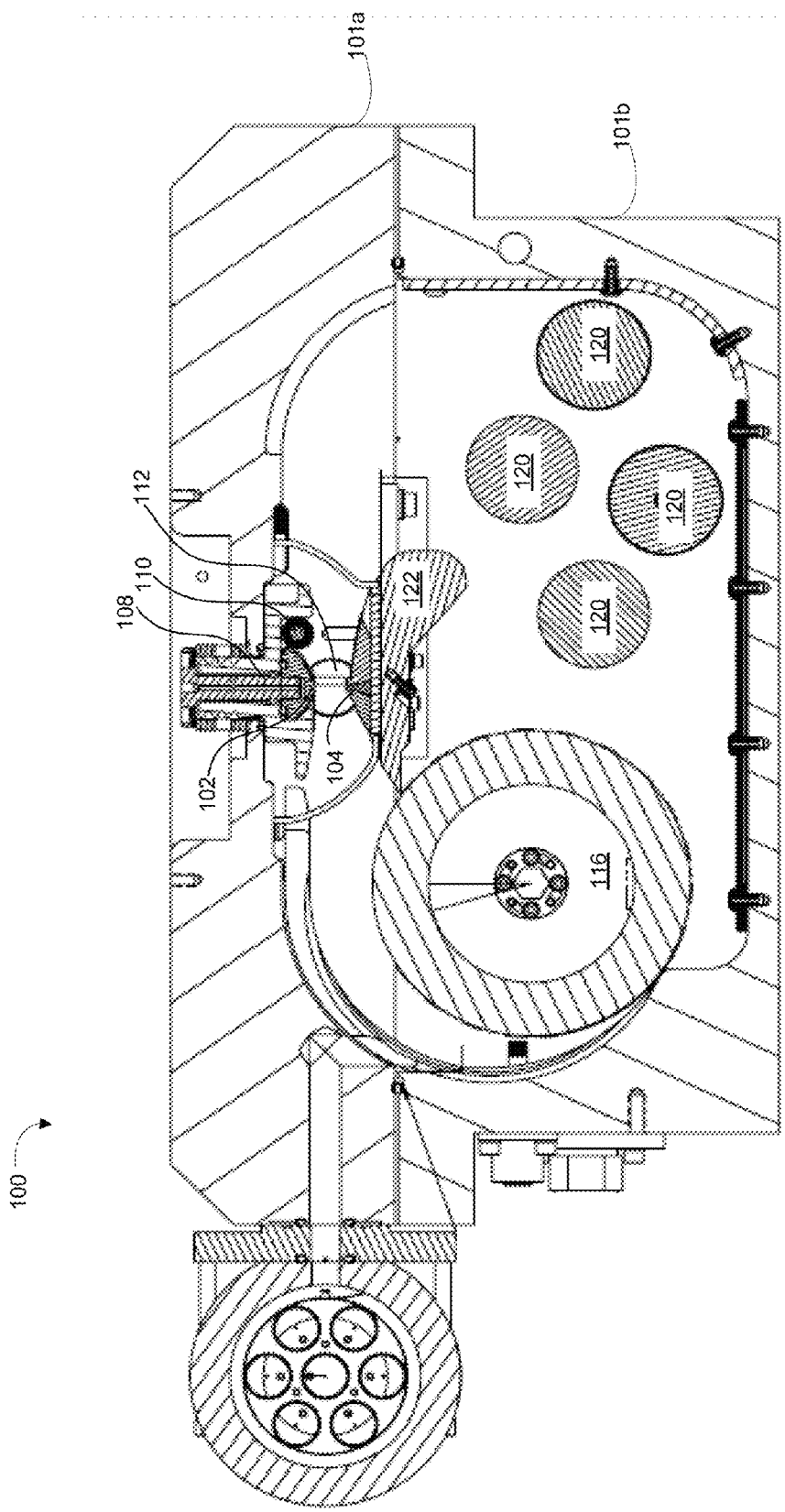
FIG. 1 shows a cross-sectional view of a gas discharge laser chamber.

FIG. 1 shows a cross-sectional view of a gas discharge laser chamber. As shown in FIG. 1, gas discharge laser chamber 100 includes top cover 101a and bottom chamber body 101b. Two elongated electrodes 102 and 104 are disposed within chamber 100. Electrode 102, also known as a cathode, is supported by cathode support structure 108. Electrode 104, also known as an anode, is supported by anode support bar 122. Preionizer 110 serves to preionize the laser gas in discharge area 112 defined between electrodes 102 and 104. Cross flow fan 116 circulates laser gas between electrodes 102 and 104 at velocities fast enough to discharge area 112 from debris from one pulse before the next succeeding pulse. A plurality of heat exchangers 120 are provided in bottom chamber body 101b to remove the heat added to the laser gas by cross flow fan 116 and by the electrical discharges between electrodes 102 and 104. Additional details regarding the structure and operation of gas discharge laser systems are set forth in U.S. application Ser. No. 12/603,486, filed on Oct. 21, 2009, and entitled "Gas Discharge Laser Chamber," U.S. Patent Application Publication No. US 2002/0154670 A1, and U.S. Patent Application Publication No. US 2005/0047471 A1, the disclosures of which are incorporated herein for all purposes.

Figure 2:
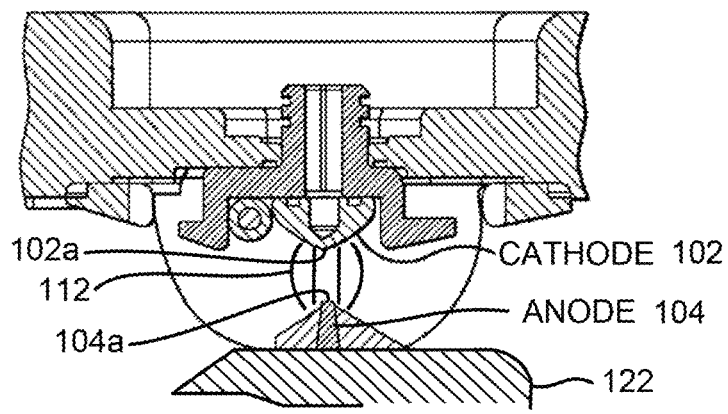
FIG. 2 shows a cross-sectional view of a portion of the interior of a gas discharge laser chamber that shows additional details of the electrodes.

FIG. 2 shows a cross-sectional view of a portion of the interior of a gas discharge laser chamber that shows additional details of the electrodes. As shown in FIG. 2, anode 104 is mounted on anode support bar 122. The elongated anode surface 104a of anode 104 faces the elongated cathode surface 102a of cathode 102. The space between elongated anode surface 104a and elongated cathode surface 102a defines discharge area 112 within the laser chamber. In one embodiment, the length of cathode 102 and anode 104 is about 57 cm. In one embodiment, the distance between elongated cathode surface 102a and elongated anode surface 104a is about 1.3 cm. Those skilled in the art will appreciate that the length of the electrodes and the distance between the electrodes may be varied to suit the needs of particular applications.

Figure 3:
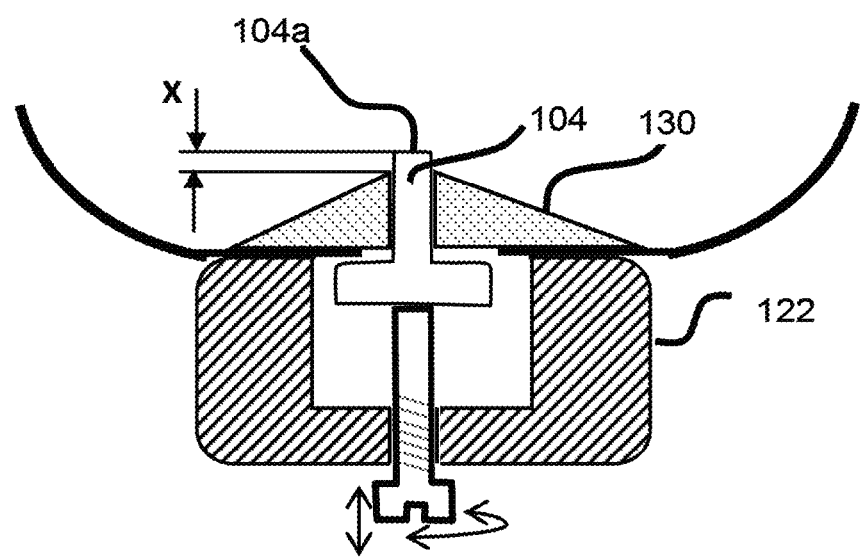
FIG. 3 shows a cross-sectional view of an anode assembly in a gas discharge laser chamber.

FIG. 3 shows a cross-sectional view of an anode assembly in a gas discharge laser chamber. As shown in FIG. 3, anode 104 is disposed on anode support bar 122, which serves as a support member for the anode. Insulating member 130 surrounds anode 104 so that elongated anode surface 104a extends just above the upper surface of the insulating member. Insulating member 130 may be formed of any suitable insulative material. In one embodiment, insulating member 130 is formed of alumina, which has excellent dielectric properties. The distance between elongated anode surface 104a and the upper surface of insulating member 130 is indicated by the designation "X" shown in FIG. 3. As elongated anode surface 104a erodes during operation of the laser chamber, the distance X can be maintained by adjusting the relative height of anode 104 using an adjustment mechanism provided in anode support bar 122.

Figure 4:
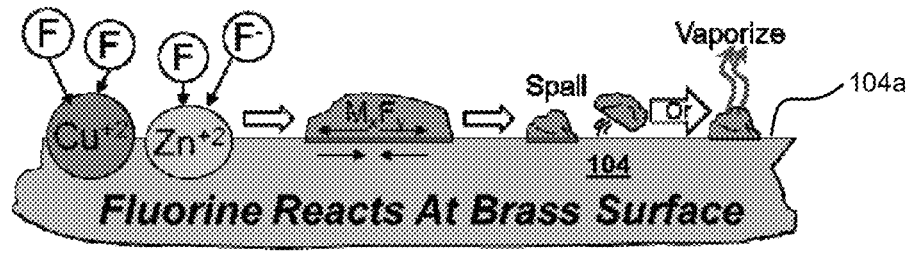
FIG. 4 is a schematic illustration of the surface corrosion reaction that occurs as part of a metal plus fluorine corrosion reaction.

Based on experimental work conducted to date, it is currently believed that reef formation is the breakaway corrosion phase of a metal plus fluorine corrosion reaction that initially begins as a surface corrosion reaction and over time transitions to a subsurface corrosion reaction known as internal fluoridation. FIG. 4 is a schematic illustration of the surface corrosion reaction. As shown in FIG. 4, fluorine reacts with copper and zinc ions at the brass surface 104a to form a metal fluoride corrosion product, $M_xF_y$. The corrosion product is subjected to Pilling-Bedworth stresses due to lattice mismatch and thermal mismatch stresses between the metal fluorides on the surface and the underlying brass, resulting in spallation of the corrosion product. The action of the plasma can also cause the corrosion product to vaporize. The material loss caused by such spallation and vaporization is sometimes referred to as erosion; however, it will be appreciated by those skilled in the art that particulate impingement does not play any role in this material loss phenomenon.

Figure 5:
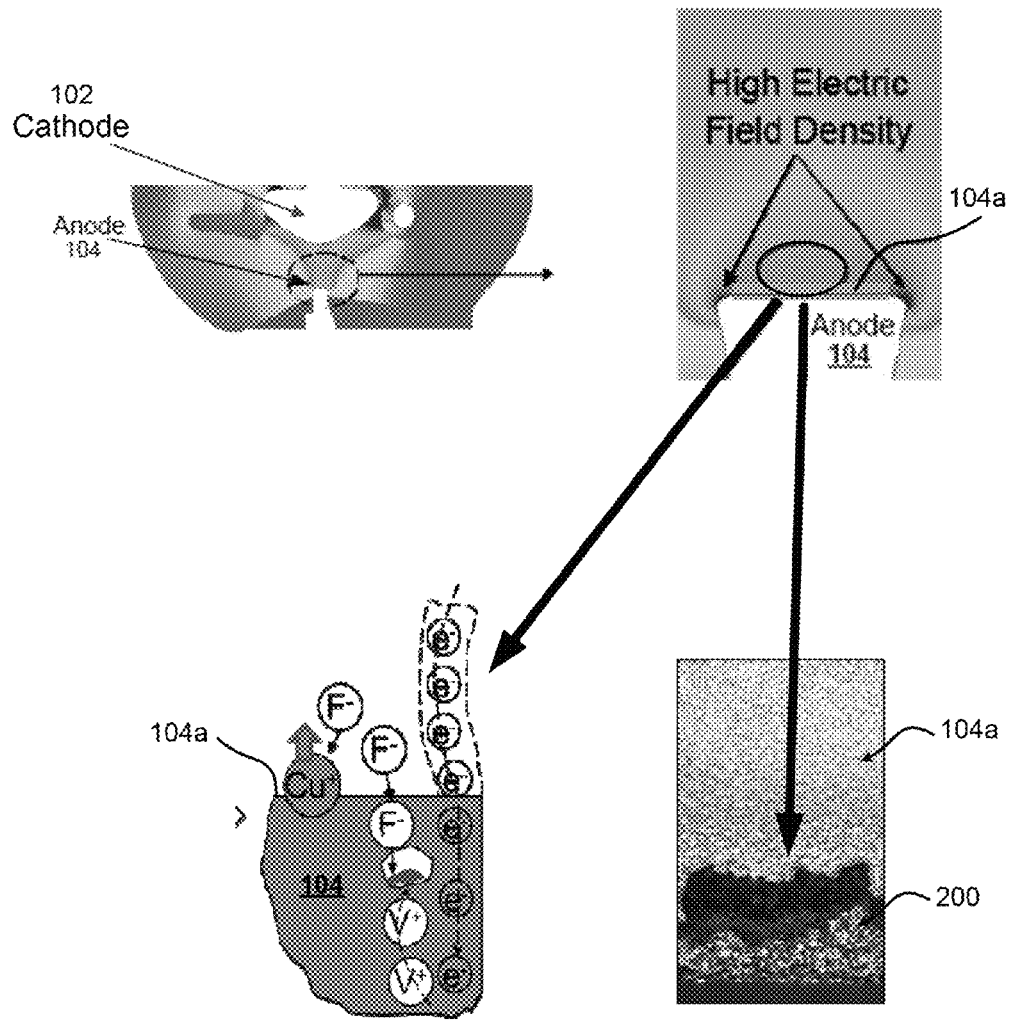
FIG. 5 is a schematic illustration of breakaway corrosion via internal fluoridation that occurs as part of a metal plus fluorine corrosion reaction.

FIG. 5 is a schematic illustration of breakaway corrosion via internal fluoridation. Reef formation or breakaway corrosion occurs when fluorine diffuses through the brass and accumulates in subsurface voids. These voids look similar to Kirkendall voids; however, it is important to note that this phenomenon also occurs in electrodes made from pure metals such as copper (see FIG. 13). Therefore, the void formation is not due to any differential between the self-diffusion of copper and zinc through the brass lattice. The voids are the result of vacancy agglomeration and metal ion outward diffusion under the action of strong electric fields and associated high current densities. This action is much more similar in nature to electromigration than either high temperature corrosion or electrochemical corrosion. The high current densities also facilitate movement of fluorine through the brass. When fluorine accumulates in void pockets below the surface of the brass, the metal fluoride has room to expand its larger lattice and is protected from spallation and vaporization. This protection allows the corrosion product to thicken into a strong adherent layer. Once the layer of the corrosion product thickens and begins to draw substantial current via charge accumulation on the dielectric surface, the driving force for metal fluoride formation increases, resulting in localized, breakaway corrosion or reef formation. As shown in FIG. 5, reef formation tends to occur in regions of high electric field density that are generated on the surface 104a of the anode 104. An example of reef formation on the surface 104a of an anode is shown in FIG. 5. In particular, as shown in the photomicrograph included as part of FIG. 5, reef spot 200 has formed on surface 104a of the anode.

It has been discovered that the corrosion resistance of an electrode, e.g., an anode, can be significantly increased by eliminating microporosity in the material from which the electrode is formed, by pinning vacancies, by reducing the self-diffusion rate of the anode constituents, and by reducing the susceptibility of the grain boundaries to fluorine diffusion. Microporosity, which occurs naturally in brass, provides a source of vacancies for electromigration-type effects and thereby a means of entry for fluorine into the bulk of the brass from which the electrode is formed. In this way, microporosity facilitates corrosion via internal fluoridation and current-assisted diffusion. Fluorine also can enter the bulk of the brass from which the electrode is formed through grain boundaries. By preventing fluorine from entering the brass lattice structure, the extent to which reef formation occurs can be reduced.

In the case of the cathode, high current densities can cause electromigration. Vacancies in the metal lattice move opposite to the flow of electrons. Over time the porosity of the cathode can increase. As the surface of the cathode erodes, exposed voids create surface discontinuities that roughen the surface of the electrode, which increase the probability of high current discharge events (such as arcs or streamers) at the location of the discontinuities. Fluoridation is thermally enhanced and a reef spot can form on the cathode, particularly within cathode pits. The arc and streamer activity also creates the foundation for continued high current density discharges within a small region of the discharge gap. If the high density current terminates repeatedly on the same spot on the opposite electrode, the resulting joule heating can create a hot spot on the anode. Fluoridation is also thermally enhanced in this location and a reef spot eventually forms on the anode.

In one embodiment, the corrosion resistance of an electrode is increased by doping the brass from which the electrode is formed with phosphorus. In one embodiment, the brass is cartridge brass that contains about 30 weight percent copper and the balance zinc. As used herein, the term "about" means that the stated amount can be varied within an acceptable range of tolerance, e.g., plus or minus 1 percent. It will be appreciated by those skilled in the art that electrodes can be made of brass materials other than cartridge brass. It is noted that phosphorus is not the only element that can be used to pin vacancies or slow self-diffusion through the metal lattice. In brass, similar effects can achieved through the use of arsenic or antimony, either alone or in combination with phosphorus. In the embodiments described herein, phosphorus is used because phosphorus also has the effect of degassing the brass during casting thereby reducing microporosity.

The amount of phosphorus used to dope the brass must be sufficient to inhibit the electromigration effect that allows vacancies and fluorine to move easily through the lattice of the brass and inhibit the self-diffusion of copper and zinc ions. On the other hand, the amount of phosphorus used must not have an adverse impact on the operation of the gas discharge laser system. In this regard, it is noted that the use of about 1 weight percent of phosphorus, which corresponds to about 10,000 ppm, would significantly increase the fluorine consumption of the laser chamber. In one embodiment, the amount of phosphorus used is in the range from about 100 ppm (by weight) to about 1,000 ppm (by weight). In another embodiment, the amount of phosphorus used is in the range from about 120 ppm to about 370 ppm. The phosphorus (P), zinc (Zn), and copper (Cu) contents in the brass can be determined by any suitable method, e.g., inductively coupled plasma-optical emission spectroscopy (ICP-OES).

The phosphorus-doped brass should be prepared in a manner that allows the total impurities limit to be controlled. It is important to control the amount of impurities in the phosphorus-doped brass because impurities react readily with fluorine and can thereby result in the formation of unintended pockets of metal fluoride that serve as nucleation sites in the material. As an example, iron impurities form a metal fluoride much more readily than copper. Iron-rich inclusions in the brass will easily form $FeF_2$, therefore iron content must be kept as low as possible. In one embodiment, the total amount of impurities in the material is less than 100 ppm. Gas impurities in the melt can cause microporosity as such impurities come out of solution during solidification. In one embodiment, the dissolved gases in the material are controlled so that the amount of oxygen is less than 30 ppm, the amount of carbon is less than 75 ppm, the amount of nitrogen is less than 15 ppm, and the amount of hydrogen is less than 10 ppm. The amount of dissolved gases in the material can be determined by any suitable method, e.g., interstitial gas analysis. Table 1 is list of concentration limits (in ppm by weight) for individual elemental impurities. The concentrations of these elemental impurities can be determined by any suitable method, e.g., glow discharge mass spectrometry (GDMS). Those skilled in the art will appreciate that the total impurities limit does not include the amount of phosphorus contained in the material.

TABLE 1

| Element | Concentration (ppm wt) |
|---|---|
| Li | <0.1 |
| Be | <0.1 |
| B | <0.1 |
| F | <1 |
| Na | <1 |
| Mg | <0.1 |
| Al | <1 |
| Si | <1 |
| S | <5 |
| Cl | <1 |
| K | <1 |
| Ca | <1 |
| Sc | <1 |
| Ti | <1 |
| V | <1 |
| Cr | <1 |
| Mn | <1 |
| Fe | <10 |
| Co | <2 |
| Ni | <3 |
| Ga | <1 |
| Ge | <1 |
| As | <3 |
| Se | <1 |
| Br | <1 |
| Rb | <1 |
| Sr | <1 |
| Y | <1 |
| Zr | <1 |
| Nb | <1 |
| Mo | <1 |
| Ru | <1 |
| Rh | <1 |
| Pd | <1 |
| Ag | <15 |
| Cd | <1 |
| In | <1 |
| Sn | <3 |
| Sb | <2 |
| Te | <2 |
| I | <1 |
| Cs | <1 |
| Ba | <1 |

TABLE 1-continued

| Element | Concentration (ppm wt) |
|---|---|
| La | <1 |
| Ce | <1 |
| Pr | <1 |
| Nd | <1 |
| Sm | <1 |
| Eu | <1 |
| Gd | <1 |
| Tb | <1 |
| Dy | <1 |
| Ho | <1 |
| Er | <1 |
| Tm | <1 |
| Yb | <1 |
| Lu | <1 |
| Hf | <1 |
| Ta | <5 |
| W | <1 |
| Re | <1 |
| Os | <1 |
| Ir | <1 |
| Pt | <1 |
| Au | <1 |
| Hg | <1 |
| Tl | <3 |
| Pb | <25 |
| Bi | <1 |
| Th | <0.01 |
| U | <0.01 |

To ensure that the phosphorus in the phosphorus-doped brass is acting as a degassing agent to reduce microporosity in the material, the phosphorus-doped brass should be visually inspected, e.g., by optical microscopy, for the presence of voids and inclusions. In one embodiment, no voids are visible at a magnification of 400×. In other words, in this embodiment, the phosphorus-doped brass has no visible microporosity at the magnification of 400×. Further, in one embodiment, the phosphorus-doped brass has less than 30 inclusions per $mm^2$ and each inclusion has a diameter that does not exceed about 5 microns. Density measurements can also be used to ascertain the material quality, although this is a less sensitive measurement than microstructural inspection. Experimental density measurements of the cathode before and after usage show a drop in density of about 1%.

Figure 6:
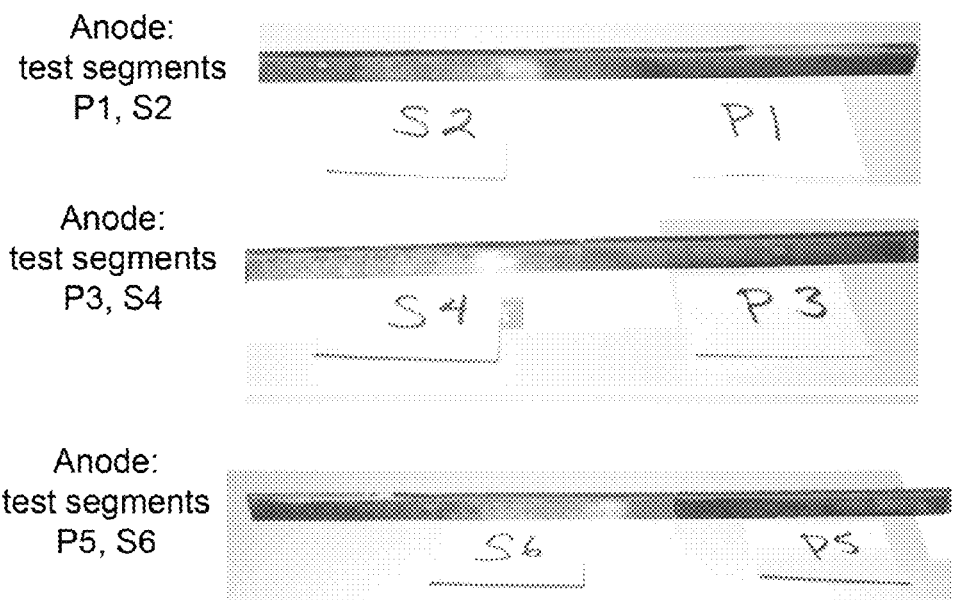
FIG. 6 shows the test segments used to form a segmented test anode.
Figure 7:
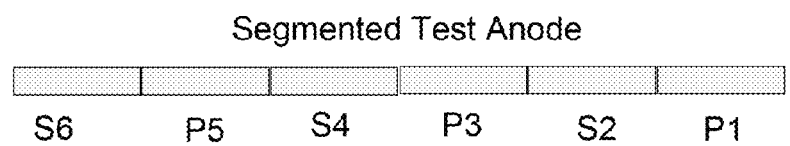
FIG. 7 shows the arrangement of the test segments in the segmented test anode.
Figure 8:
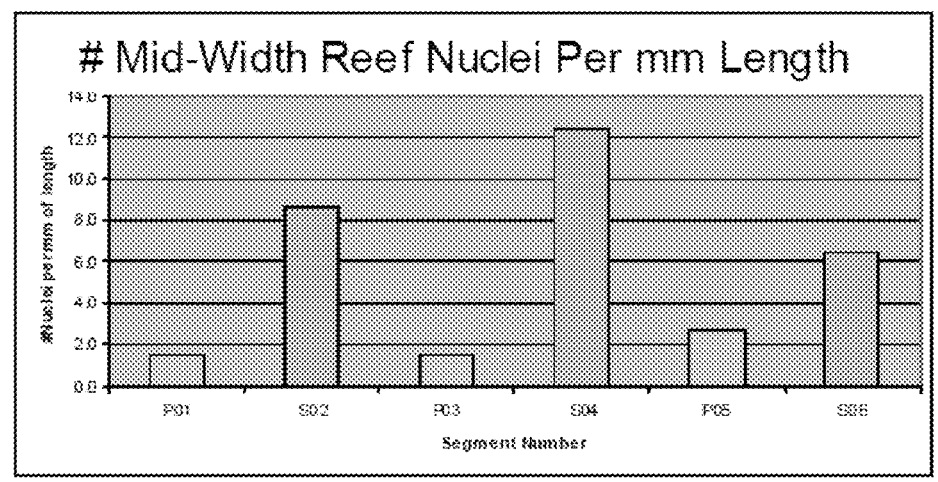
FIG. 8 is a bar chart that shows the number of mid-width reef nuclei per mm length for each of the segments in the segmented test anode.

To confirm the corrosion resistance of an electrode, e.g., an anode, formed of phosphorus-doped brass, testing was conducted using a segmented anode comprised of alternating segments of phosphorus-doped brass and C26000 brass. The segments P1, P3, P5, S2, S4, and S6 used to form the segmented anode are shown in FIG. 6. Of these segments, segments P1, P3, and P5 were formed of phosphorus-doped brass and segments S2, S4, and S6 were formed of C26000 brass. The segmented anode was formed by arranging the segments in alternating fashion as shown in FIG. 7. The segmented test anode was tested in a test chamber and then the segments were analyzed for reef formation. As shown in FIG. 8, the number of mid-width reef nuclei per unit length found in the phosphorus-doped brass (see segments P3 and P5) was significantly lower than the number of mid-width reef nuclei per unit length found in C26000 brass (see segments S2 and S4). Thus, phosphorus-doped brass exhibits increased corrosion resistance relative to C26000 brass.

Figure 9:
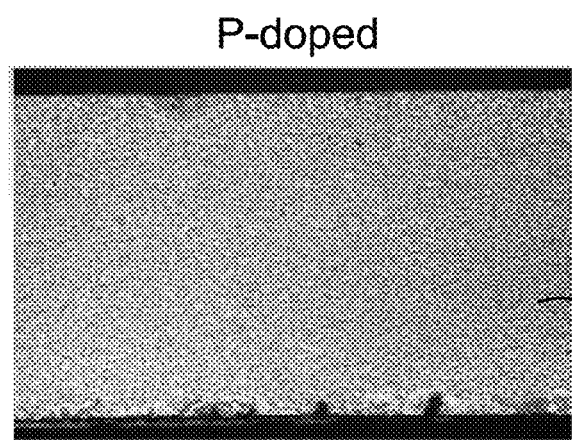
FIG. 9 is a photomicrograph of a plasma-facing surface of a phosphorus-doped brass segment taken at a magnification of 25×.
Figure 10:
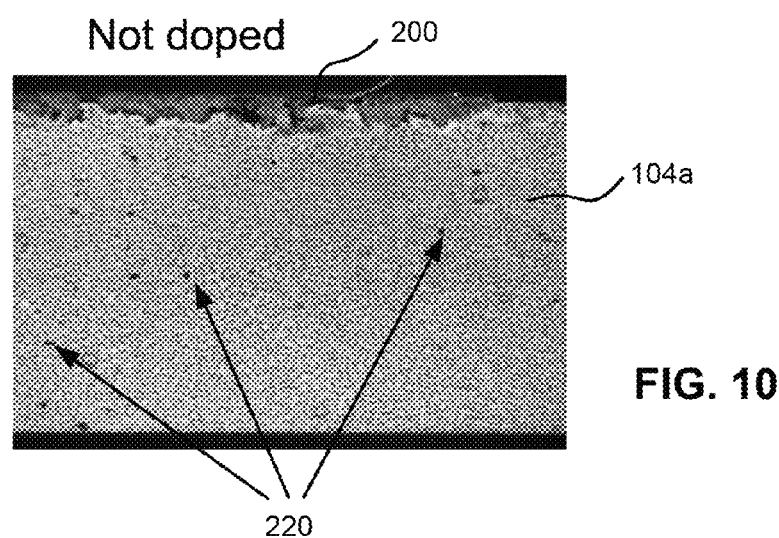
FIG. 10 is a photomicrograph of a plasma-facing surface of a C26000 brass segment taken at a magnification of 25×.

FIG. 9 is a photomicrograph of a plasma-facing surface of phosphorus-doped brass segment P3 taken at a magnification of 25×. As shown in FIG. 9, the surface 104a of segment P3 is relatively smooth and has incurred only a modest amount of corrosion at the edges. Further, the interior portion of segment P3 is substantially free of voids. FIG. 10 is a photomicrograph of a plasma-facing surface of C26000 brass segment S4 taken at a magnification of 25×. As shown in FIG. 10, the surface of segment S4 has begun to exhibit significant corrosion. In addition, a layer 200 of metal fluoride corrosion product (reef spot) has formed along the edge of segment S4 and this layer protrudes above the surface. As previously discussed, such protrusions can cause arcing over time in the laser chamber. Further, the interior portion of segment P4 includes a substantial number of voids 220, which appear as dark spots in the photomicrograph. The voids 220 have begun to fill with metal fluoride and, as previously discussed, provide a place for the metal fluoride to grow that is protected from spallation and vaporization.

Figure 11:
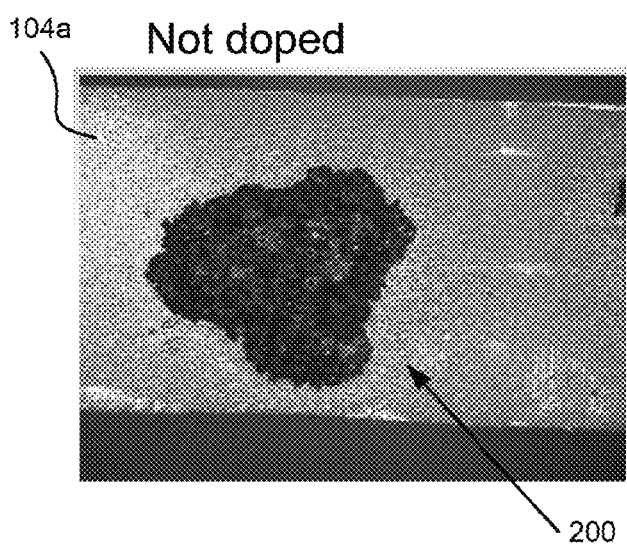
FIG. 11 is a photomicrograph of the plasma-facing surface of an anode formed of cartridge brass taken at a magnification of 25×.

FIG. 11 is a photomicrograph of the plasma-facing surface of an anode formed of non-doped, cartridge brass taken at a magnification of 25×. This anode was tested in a baseline test chamber. As shown in FIG. 11, region 200 is a reef spot that has formed on the surface 104a of the anode.

Figure 12:
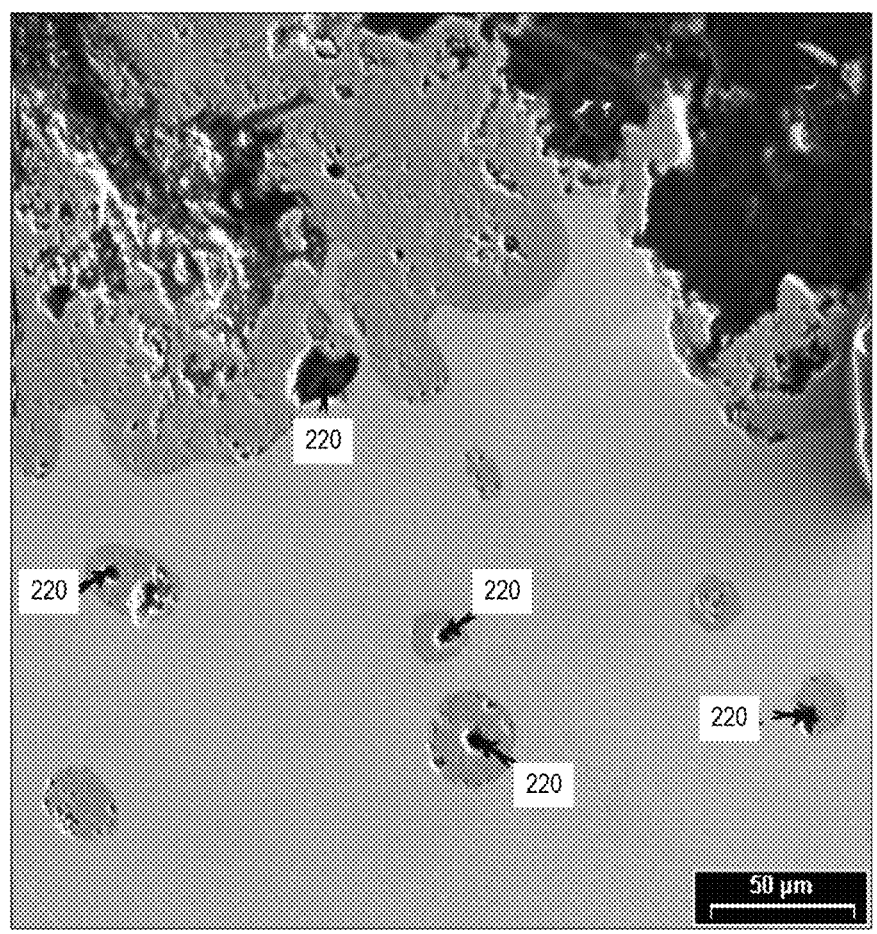
FIG. 12 is a photomicrograph of a cross section of a C26000 brass electrode that has a reef layer formed on the surface thereof.
Figure 13:
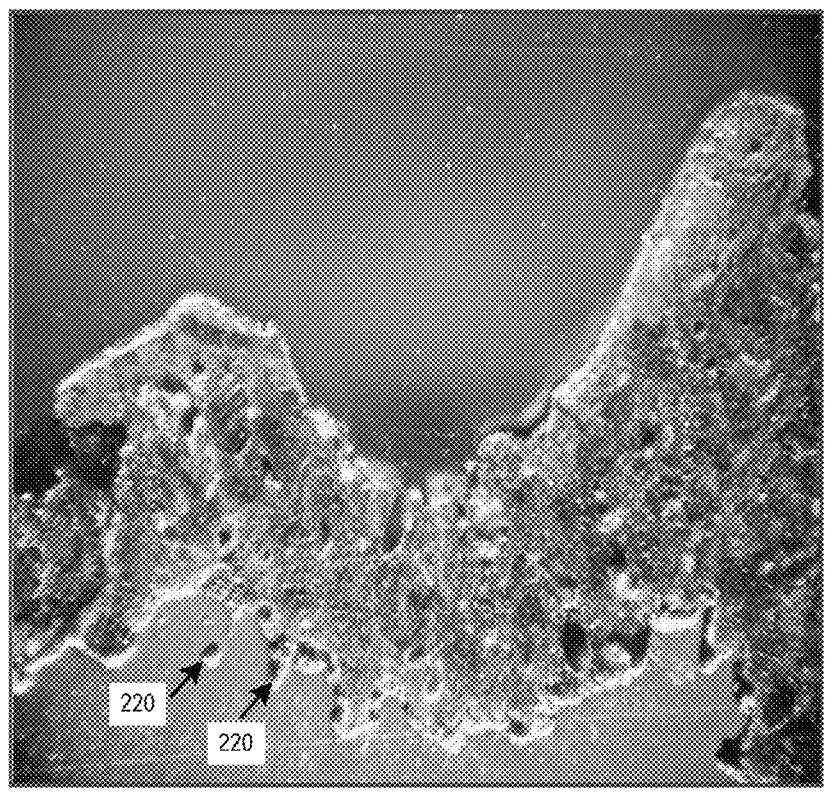
FIG. 13 is a photomicrograph of a cross section of a pure copper electrode that has a reef layer formed on the surface thereof.

FIG. 12 is a photomicrograph of a cross section of a C26000 brass electrode that has a reef layer formed on the surface thereof. As shown in FIG. 12, a number of voids 220 have formed below the surface of the C26000 brass electrode and the inside walls of these voids are covered with metal fluoride. FIG. 13 is a photomicrograph of a cross section of a pure copper electrode that has a reef layer formed on the surface thereof. The same subsurface voiding found in the C26000 brass electrode exists in the pure copper electrode (see voids 220 shown in FIG. 13). Pure copper, however, is incapable of exhibiting Kirkendall voiding because it is unalloyed. Moreover, the pure copper was fully dense and free of microporosity at the outset. Thus, the existence of voids in the pure copper electrode supports the conclusion that the corrosion phenomenon involves an electromigration phenomenon, rather than being purely a high temperature corrosion phenomenon. Reef formation is quite different from an electrochemical corrosion phenomenon. Accordingly, as discussed above, it is believed that reefing represents a unique mode of corrosion, which is referred to herein as "plasma corrosion."

In the foregoing examples, the use of phosphorus doping to increase the corrosion resistance of brass is described. It has been found that other treatments can be used to increase the resistance of brass to the type of corrosion that occurs in a laser chamber environment. In one embodiment, the corrosion resistance of brass is increased by subjecting the brass to severe plastic deformation, which reduces the microporosity in the brass. In one embodiment, the brass is subjected to severe plastic deformation using equal channel angular extrusion (ECAE), which is a severe plastic deformation technology. As will be appreciated by those skilled in the art, ECAE processing can close microporosity and create mid- to high-angle grain boundaries with submicron grain sizes via rotation of low angle sub-grain boundaries. Thus, similar to deoxidizing obtained via phosphorus doping, ECAE processing can eliminate subsurface pockets where fluorine can accumulate and grow protected metal fluoride. In particular, ECAE processing produces very tight, low porosity grain boundaries which may have less of a tendency to act as vacancy sources.

As such, reef formation in electrodes can be suppressed by forming the electrode from brass that has been subjected to treatment to increase the resistance of the brass to plasma corrosion. In one embodiment, the treatment to increase the corrosion resistance of the brass includes doping the brass with an effective amount of phosphorus. In one embodiment, the amount of phosphorus is about 120 ppm to about 370 ppm. In another embodiment, the treatment includes subjecting the brass to severe plastic deformation, e.g., subjecting the brass to ECAE. The thus-formed electrode can then be used in a laser system to generate laser light.

In laboratory tests, phosphorus-doped brass electrodes exhibited lifetimes in excess of 30 billion pulses. In contrast, the non-doped electrodes presently used in gas discharge laser chambers typically exhibit lifetimes shorter than 30 billion pulses. Accordingly, the use of electrodes that have been formed from brass that has been subjected to treatment to increase the resistance of the brass to plasma corrosion can help extend the lifetime of gas discharge laser chambers.

The techniques described herein are not necessarily restricted to cartridge brass type formulations, or even necessarily to brass. For example, other copper alloys such as C12200, C14200, C63200, C95400, and C96800, or spinodal bronzes such as those described in U.S. Pat. No. 6,584,132 B2 could be treated with phosphorus or ECAE or a combination of the two to create resistance to current-assisted fluorine diffusion and electromigration. The disclosure of U.S. Pat. No. 6,584,132 B2 is incorporated by reference herein for all purposes.

Accordingly, the disclosure of the example embodiments is intended to be illustrative, but not limiting, of the scope of the inventions, which are set forth in the following claims and their equivalents. Although example embodiments of the inventions have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

What is claimed is:

1. A laser system, comprising:
a chamber;
a cathode disposed within the chamber, the cathode having an elongated cathode surface; and
an anode disposed within the chamber, the anode having an elongated anode surface that faces the elongated cathode surface, a space between the elongated anode surface and the elongated cathode surface defining a discharge area within the chamber, the anode being formed of brass that contains about 100 ppm to about 1,000 ppm of phosphorus, wherein the brass has less than 30 inclusions per mm$^2$ and each inclusion has a diameter that does not exceed about 5 microns, and the brass exhibits increased resistance to plasma corrosion relative to cartridge brass that has not been doped with phosphorus.

2. The laser system of claim 1, wherein the brass contains about 120 ppm to about 370 ppm of phosphorus.

3. The laser system of claim 2, wherein the brass is cartridge brass that contains 29.7 weight percent to 30.3 weight percent of zinc and the balance copper.

4. The laser system of claim 3, wherein a total amount of impurities in the cartridge brass is less than 100 ppm.

5. The laser system of claim 1, wherein the anode is movably disposed within the chamber.

6. A laser system, comprising:
a chamber;
a cathode disposed within the chamber, the cathode having an elongated cathode surface, the cathode being formed of brass that contains about 100 ppm to about 1,000 ppm of phosphorus, the brass having no visible microporosity at a magnification of 400×, and the brass exhibiting increased resistance to plasma corrosion relative to cartridge brass that has not been doped with phosphorus; and
an anode disposed within the chamber, the anode having an elongated anode surface that faces the elongated cathode surface, a space between the elongated anode surface and the elongated cathode surface defining a discharge area within the chamber.

7. The laser system of claim 6, wherein the brass contains about 120 ppm to about 370 ppm of phosphorus.

8. The laser system of claim 7, wherein the brass is cartridge brass that contains 29.7 weight percent to 30.3 weight percent of zinc and the balance copper.

9. The laser system of claim 8, wherein a total amount of impurities in the cartridge brass is less than 100 ppm.

10. A laser system, comprising:
a chamber;
a cathode disposed within the chamber, the cathode having an elongated cathode surface; and
an anode disposed within the chamber, the anode having an elongated anode surface that faces the elongated cathode surface, a space between the elongated anode surface and the elongated cathode surface defining a discharge area within the chamber, the anode being formed of a material consisting essentially of 29.7 weight percent to 30.3 weight percent of zinc, 120 ppm to 370 ppm of phosphorus, less than 100 ppm of impurities, and the balance copper, wherein the material has no visible microporosity at a magnification of 400×, and the material exhibits increased resistance to plasma corrosion relative to cartridge brass that has not been doped with phosphorus.

11. The laser system of claim 10, wherein the anode is movably disposed within the chamber.

12. A laser system, comprising:
a chamber;
a cathode disposed within the chamber, the cathode having an elongated cathode surface, and the cathode being formed of a material consisting essentially of 29.7 weight percent to 30.3 weight percent of zinc, 120 ppm to 370 ppm of phosphorus, less than 100 ppm of impurities, and the balance copper, wherein the material has no visible microporosity at a magnification of 400×, and the material exhibits increased resistance to plasma corrosion relative to cartridge brass that has not been doped with phosphorus; and
an anode disposed within the chamber, the anode having an elongated anode surface that faces the elongated cathode surface, a space between the elongated anode surface and the elongated cathode surface defining a discharge area within the chamber.

13. A laser system, comprising:
a chamber;
a cathode disposed within the chamber, the cathode having an elongated cathode surface; and
an anode disposed within the chamber, the anode having an elongated anode surface that faces the elongated cathode surface, a space between the elongated anode surface and the elongated cathode surface defining a discharge area within the chamber, the anode being formed of brass that contains about 100 ppm to about 1,000 ppm of phosphorus, the brass having no visible microporosity at a magnification of 400×, and the elongated anode surface exhibits increased resistance to plasma corrosion relative to cartridge brass that has not been doped with phosphorus.

14. The laser system of claim 13, wherein the brass contains about 120 ppm to about 370 ppm of phosphorus.

15. The laser system of claim 14, wherein the brass is cartridge brass that contains 29. 7 weight percent to 30.3 weight percent of zinc and the balance copper.

16. The laser system of claim 15, wherein a total amount of impurities in the cartridge brass is less than 100 ppm.

* * * * *